April 10, 1945.    M. P. STROME ET AL    2,373,430
GUM MASSAGER
Filed April 19, 1944    2 Sheets-Sheet 1
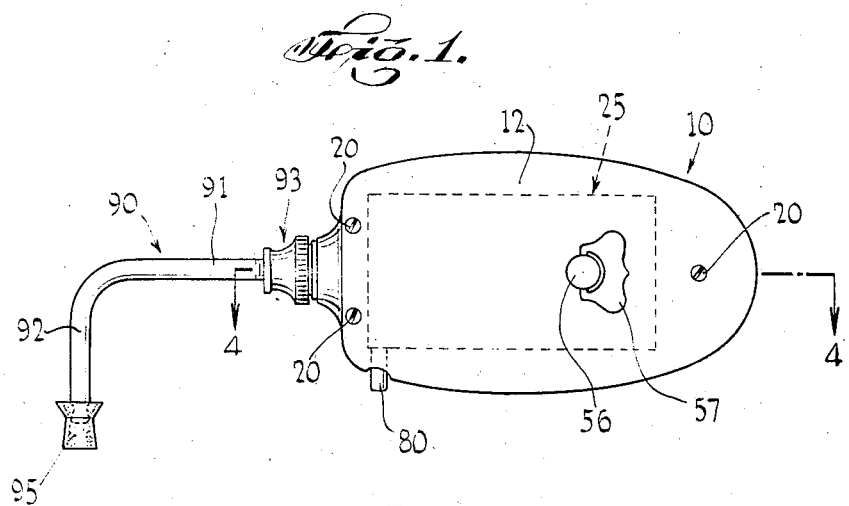
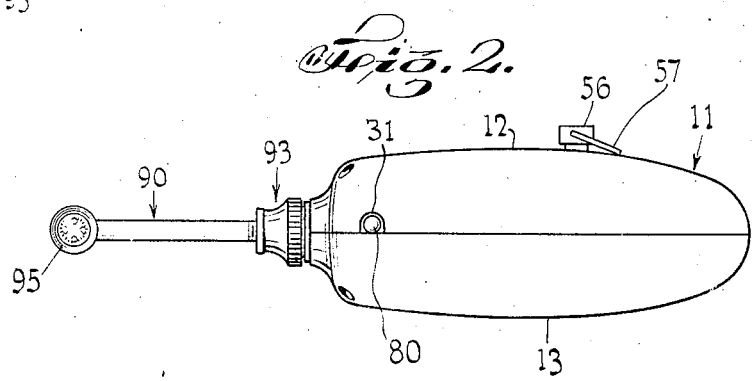
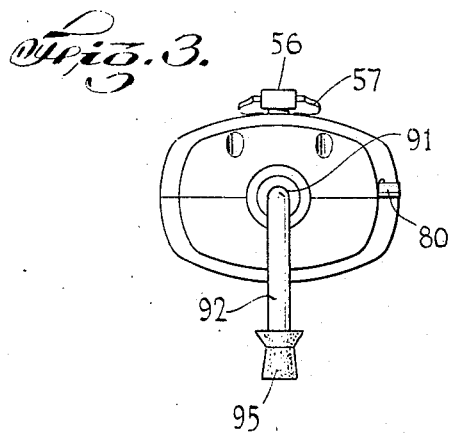
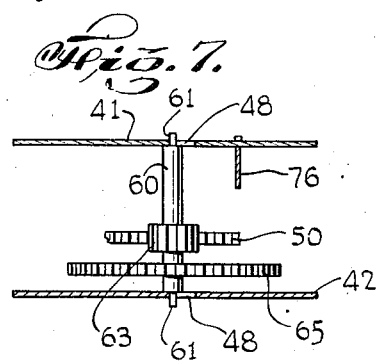
INVENTORS
MONTE P. STROME AND
JOSEPH LIEBERMAN
BY
J. B. Felshin
ATTORNEY April 10, 1945. M. P. STROME ET AL 2,373,430
GUM MASSAGER
Filed April 19, 1944 2 Sheets-Sheet 2

INVENTORS
MONTE P. STROME AND
JOSEPH LIEBERMAN
BY J. B. Felshin
ATTORNEY

Patented Apr. 10, 1945

2,373,430

UNITED STATES PATENT OFFICE 2,373,430

GUM MASSAGER

Monte P. Strome and Joseph Lieberman, New York, N. Y.

Application April 19, 1944, Serial No. 531,747

6 Claims. (Cl. 128—62)

This invention relates to gum massager.

An object of this invention is to provide a gum massager comprising a casing adapted to be held in the hand and containing a spring motor and an offset fly wheel adapted to be rotated by the motor for vibrating the casing, and being further provided with a manually controlled brake to stop rotation of the fly wheel.

Another object of this invention is to provide in a gum massager a massaging member removably mounted on the casing and adapted to vibrate with the casing, said member being adjustable on the casing to various angular positions and carrying a gum massaging element.

Yet another object of this invention is to provide a compact, rugged and durable gum massager of the character described which shall comprise few and simple parts, which shall be easy to assemble and manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings in which is shown one of the various possible illustrative embodiments of this invention, Fig. 1 is a top plan view of a gum massager embodying the invention;

Fig. 2 is a side elevational view thereof;

Fig. 3 is an end view thereof;

Fig. 7 is a partial cross-sectional view taken on line 7—7 of Fig. 5.

Figure 4:
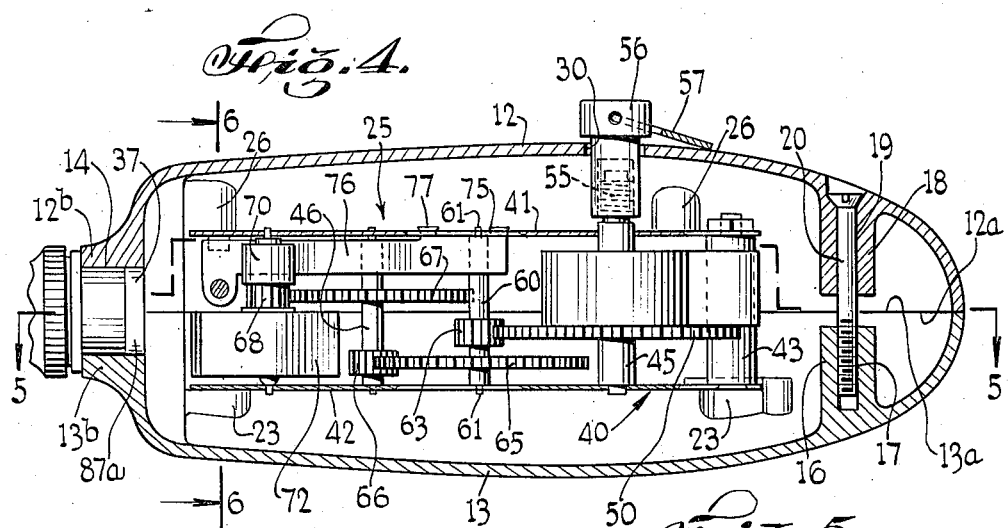
Fig. 4 is a cross-sectional view taken on line 4—4 of Fig. 1.
Figure 5:
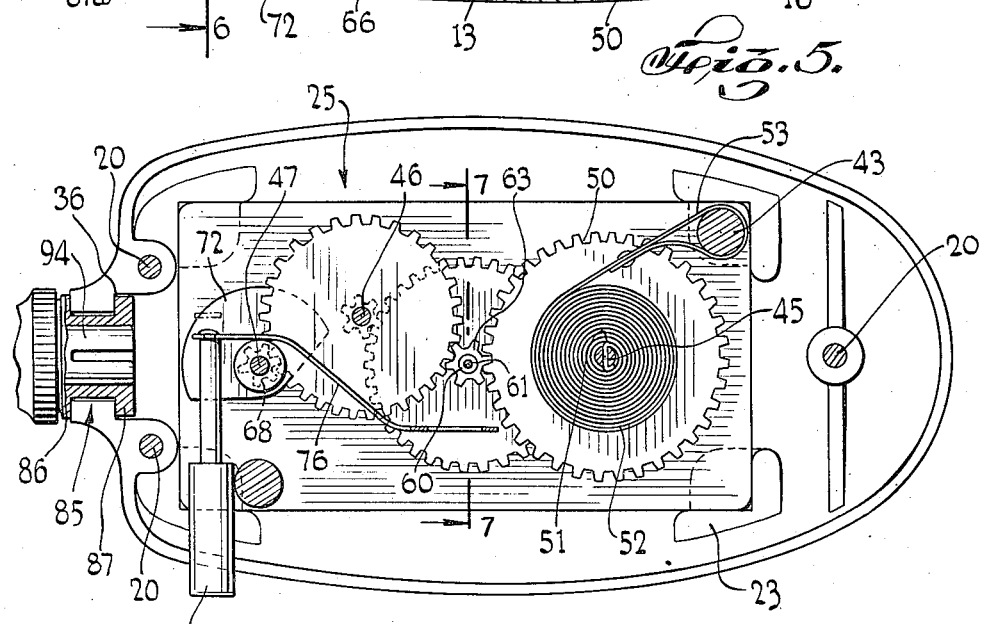
Fig. 5 is a cross-sectional view taken on line 5—5 of Fig. 4.
Figure 6:
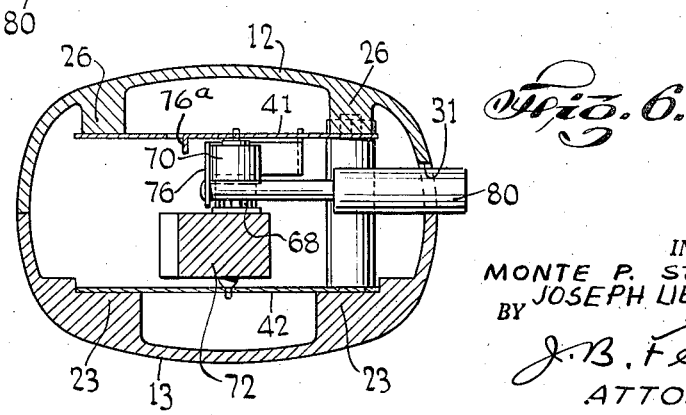
Fig. 6 is a cross-sectional view taken on line 6—6 of Fig. 4.

Referring now in detail to the drawings, 10 designates a gum massager embodying the invention. The same comprises a split casing 11 made of molded or cast material such as plastic composition, or of any other suitable material.

The casing 11 comprises hollow complementary parts 12 and 13 fitted together to form the casing. The parts 12 and 13 have contacting edges 12a and 13a. Said parts are furthermore formed with neck portions 12b and 13b respectively, together forming a neck opening 14 at one end of the casing.

Extending from the bottom of the part 13 are a plurality of bosses 16 formed with internal threads 17. Extending downwardly from the top of part 12 are bosses 18 aligned with the bosses 16 and formed with countersunk through openings 19 to receive fastening screws 20 for fastening together the parts 12 and 13 of the casing. The bottom part 13 is furthermore formed with four integral molded corner supports 23 to hold in place the vibrating mechanism 25. Part 12 is formed with integral holders 26 to retain the mechanism 25 on the corner supports 23. Part 12 is furthermore formed with a through opening 30 for the purpose hereinafter appearing, and it is also formed with a notch 31 in the edge 12a thereof. The use of the notch 31 will appear hereinafter.

At the inside of the neck opening 14 parts 12 and 13 are formed with recess grooves 36. Said grooves are formed with flat surface 37.

The vibrating mechanism 25 comprises a metal frame 40 having parallel top and bottom walls 41 and 42 respectively, interconnected by spacing bolts 43. Rotatably mounted on walls 41 and 42 of frame 40 are parallel shafts 45, 46 and 47. Walls 41 and 42 are furthermore formed with aligned slots 48 for the purpose hereinafter appearing located between shafts 45, 46. On shaft 45 is a gear 50. Fixed to the shaft 45 is the inner end 51 of a spiral coil spring 52. The outer end of the coil spring is attached to one of the bolts 43 as shown at 53. The upper end of shaft 45 is formed with left handed threads 55 and screwed thereon is a winding stem 56 passing through opening 30 in part 12. Hinged to the outer end of the stem 56 is a wing handle 57.

Mounted on and between the walls 41 and 42 is a shaft 60 having stems 61 passing through the slots 48. The shaft thus has a slight floating movement or play. On shaft 60 is a pinion or gear 63 meshing with gear 50. The slots 48 are substantially tangent to a circle having its center at shaft 45 and a radius equivalent to the distance between shafts 45 and 60, so that as shaft 60 floats gear 63 will always keep in engagement with gear 50.

On shaft 60 is a second larger gear 65. Shaft 46 is provided with a pinion 66 which meshes with the gear 65 in one position of the shaft 60 but which is disengaged from gear 65 in another position of shaft 60. Thus when the spring is being wound shaft 60 moves to a position where gear 65 and 66 will be disengaged, thereby permitting the spring to be wound without rotating shaft 46. However as gear 50 is rotated in an opposite direction when the spring motor unwinds, shaft 60 will be shifted to cause engagement between gear 65 and 66 for rotating shaft 46.

On shaft 46 is a gear 67 meshing with a gear 68 on shaft 47. On shaft 47 is an enlargement 70 for the purpose hereinafter appearing. Shaft 47 furthermore carries an offset fly wheel 72. Thus when the spring unwinds, the fly wheel rotates for vibrating the casing.

Brake means is provided to retain the shaft 47 against rotation. To this end frame wall 41 is formed with a pair of slots 75. Attached to wall 41 is a brake spring 76. Spring 76 is provided with a pair of riveted prongs 77 passing through slots 75 for attaching spring 76 to wall 41. The spring 76 is disposed at right angles to plate 41, and the free end thereof is adapted to contact the portion 70 of shaft 47. When the brake spring 76 contacts portion 70 of shaft 47, rotation of the fly wheel is braked. Riveted to the outer end of the brake spring 76 is a rod 80 passing through notch 31 in casing part 12. Upon pressing the rod 80 spring 76 is disengaged from shaft 47 to permit the spring motor to rotate the fly wheel and vibrate the casing.

Mounted on the neck of the casing is a metal sleeve 85 having flanges 86 and 87 at the ends thereof. Flange 86 contacts the outer surface of the neck of the casing whereas flange 87 fits within groove 36. Flange 87 is furthermore formed with flattened edges 87a contacting the flat portions 37 of the grooves 36. The sleeve 85 is thus prevented from rotating within the casing. It will be noted that the sleeve 85 is assembled with the casing parts and is held in place once the attaching screws 20 are tightened.

Mounted on sleeve 85 is a gum massager rod 90. Rod 90 is angularly shaped having an arm 91 and an arm 92 at right angles thereto. Screwed to one end of arm 91 is an adaptor 93 having a split stem 94 frictionally fitted within the sleeve 85. Mounted on the outer end of arm 92 is a massaging element 95 made of rubber or the like material. Member 90 can readily be withdrawn from the casing by pulling the split stem 94 out of sleeve 85. Furthermore member 90 can be rotated to any desired angular position.

It will now be understood that when the fly wheel rotates the entire casing and member 90 vibrate causing the massaging element 95 to massage the gums when pressed thereagainst.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Struck down from wall 41 is a lug 76a aligned with rod 80 and serving as a stop to limit movement of spring 76 away from the shaft portion 70.

Having thus described our invention, we claim as new and desire to secure by Letters Patent:

1. A massager, comprising a casing, a spring motor within the casing, means to wind the spring motor, an offset fly wheel in the casing adapted to be rotated by the spring motor, brake means to prevent rotation of the fly wheel, means on the casing to control the brake means, and a massaging element mounted on the casing.

2. A device of the character described comprising a two-part casing, means to attach the two parts of the casing together, said casing being formed with an opening, a sleeve non-rotatably mounted within said opening, a massaging device having a stem frictionally and rotatably engaged within said sleeve, a vibrator within said casing, said vibrator comprising a fly wheel, and a spring motor within the casing to rotate the fly wheel.

3. A device of the character described comprising a two-part casing, means to attach the two parts of the casing together, said casing being formed with an opening, a sleeve non-rotatably mounted within said opening, a massaging device having a stem frictionally and rotatably engaged within said sleeve, a vibrator within said casing, said vibrator comprising a fly wheel, a spring motor within the casing to rotate the fly wheel, spring brake means to prevent rotation of said fly wheel, and means projecting through the casing to control said brake means.

4. A device of the character described comprising a casing, an angular member having an arm frictionally engageable with the casing and angularly adjustable relative thereto, said angular member having a second arm, a massaging element at the end of said second arm, means within the casing to vibrate the casing, said vibrating means comprising a shaft, an offset fly wheel on the shaft, a spring motor within the casing for rotating the shaft, and means on the casing to wind the spring motor.

5. A device of the character described comprising a casing, an angular member having an arm frictionally engageable with the casing and angularly adjustable relative thereto, said angular member having a second arm, a massaging element at the end of said second arm, means within the casing to vibrate the casing, said vibrating means comprising a shaft, an offset fly wheel on the shaft, a spring motor within the casing for rotating the shaft, means on the casing to wind the spring motor, a brake spring adapted to press against said shaft to retain the same against rotation, and an operating means fixed to said spring and projecting through the casing.

6. A device of the character described comprising a two-part casing, means to attach the two parts of the casing together, said casing being formed with an opening, a sleeve non-rotatably mounted within said opening, a massaging device having a stem frictionally and rotatably engaged within said sleeve, a vibrator within said casing, said vibrator comprising a fly wheel, a spring motor within the casing to rotate the fly wheel, spring brake means to prevent rotation of said fly wheel, means projecting through the casing to control said brake means, and stop means to limit movement of the brake means.

MONTE P. STROME.
JOSEPH LIEBERMAN.